Nov. 29, 1949   R. L. FOWLER   2,489,370
LIQUID AND GAS SEPARATOR
Filed Oct. 29, 1945

INVENTOR.
RALPH L. FOWLER
BY
Hazard & Miller
Attorneys

Patented Nov. 29, 1949

2,489,370

UNITED STATES PATENT OFFICE 2,489,370

LIQUID AND GAS SEPARATOR

Ralph L. Fowler, Alhambra, Calif.

Application October 29, 1945, Serial No. 625,275

3 Claims. (Cl. 183—2.7)

This invention relates to improvements in liquid and gas separators and has been primarily developed to separate oil from gas as it issues from an oil well although it may be employed for other similar mixtures of liquids and gases.

An object of the invention is to provide an improved separator consisting of two vertically spaced tanks or chambers connected by a relatively narrow elongated tubular neck with means provided for introducing the influent into the lower chamber or tank to effect a primary separation of gas from oil and mist-extracting means in the upper chamber or tank for effecting a secondary separation of mist from the gas.

In liquid and gas separators heretofore devised the mist-extracting means has been located generally within the same tank or chamber into which the influent is discharged and is generally located in the top of such chamber. Influents that enter separators of this character usually do not enter at a constant or steady rate of flow. Frequently there are surges or "heads" and the gas to oil ratio is also variable. When large bodies or "slugs" of oil are discharged into the tank at high velocity it not infrequently occurs that excessive portions of the liquid or oil are thrown or splashed up on to or into the mist-extracting means thus unduly loading the mist-extractor and sometimes preventing its proper or efficient operation.

In accordance with the present invention the mist-extractor is located in a chamber that is remote from the tank or chamber into which the influent is discharged so that in effect it may be regarded as somewhat isolated therefrom. Consequently, regardless of the variations in the influent as it is discharged into the lower tank or chamber the gaseous constituents together with the contained mist is conducted off of the lower chamber and fed into the mist-extracting chamber under comparatively constant or steady conditions. There is consequently little opportunity to overload the mist-extracting means with the result that the mist-extracting means has an opportunity to function evenly and efficiently at all times.

Another object of the invention is to provide an improved oil and gas separator wherein spherically shaped tanks are employed to gain the advantages of structural strength that are inherently present in tanks of this design and in addition thereto to discharge the influent into one of said tanks in such a manner that it will be caused to whirl and film over the interior thereof which is conducive to separation of the gas from the liquid or oil. Heretofore the influent has been introduced in a whirling manner on the interior of a cylindrically shaped tank so that the filming action is due entirely to the centrifugal action of the influent exceeding the force of gravity acting on the influent. With such arrangements the liquid constituents of the influent quickly drop to the bottom of the tank whereas it is desirable to postpone or prolong this descent to afford a sufficient time delay in order that the gaseous constituents may be released. In accordance with the present invention the downwardly converging walls in the tank over which the influent is caused to whirl and film tend to retard the descent of the liquid constituent even though its circumferential velocity decreases and thus the descent is postponed adequately to permit a more complete separation of gas from oil.

Still another object of the invention is to provide an improved liquid and gas separator which in a sense may be regarded as adjustable in that the receiving tank into which the influent is discharged and the mist-extracting tank may be made up and kept in stock as standard parts but wherein the distance between these tanks is easily variable or adjustable to meet various conditions and permit the mist-extracting means to function more efficiently.

With the foregoing and other objects in view, which will be made manifest in the following detailed description and specifically pointed out in the appended claims, reference is had to the accompanying drawings for an illustrative embodiment of the invention, wherein:

Figures 1, 2, 3:
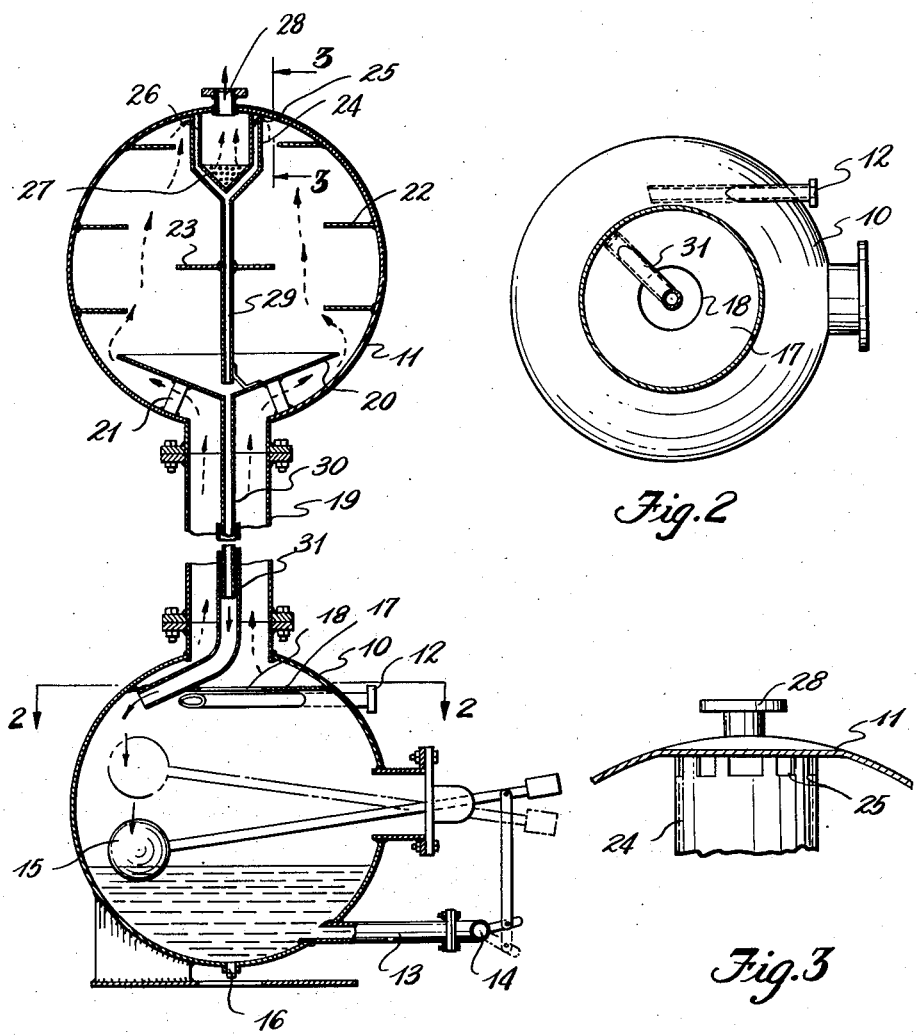
Figure 1 is a vertical section through a liquid and gas separator embodying the present invention.
Fig. 2 is a horizontal section taken substantially upon the line 2—2 upon Fig. 1.
Fig. 3 is a partial view in vertical section taken substantially upon the line 3—3 upon Fig. 1.

Referring to the accompanying drawings, wherein similar reference characters designate similar parts throughout, the improved liquid and gas separator is made up of two vertically spaced spherical tanks, the lower of which is indicated at 10 and the upper of which is indicated at 11. The lower tank may be regarded as providing a receiving chamber for receiving the influent of gas-oil mixture through an inlet pipe 12 illustrated as discharging into the lower tank in the upper half thereof and in a tangential direction so that the incoming mixture will be caused to whirl and film over the interior of the tank.

It will be appreciated by those skilled in the art that this whirling and filming action is conducive to bring about a release of gas contained in the oil. The whirling film as it descends encounters the downwardly converging wall in the lower half of the tank which tends to retard its descent even though its circumferential velocity may decrease and by thus prolonging the film on the walls of the tank a greater opportunity for release of the gas is afforded than when the influent is whirled and filmed on the interior of a cylindrical tank. The outlet for liquid or oil is illustrated at 13 which may be controlled in any suitable means such as, for example, by a valve 14 operable by a float 15. Various other devices are utilized for controlling the outlet 13 in separators of this character and any of them may be employed in the improved separator for this purpose.

16 indicates an outlet through which sand or water may be withdrawn that tend to collect in the bottom of the lower tank. In the top of the lower tank there is preferably provided a suitable baffle 17 although this baffle may be omitted. It has a relatively small center aperture 18 that is arranged beneath a tubular neck 19 that connects the lower tank 10 with the upper tank 11. The neck 19 may be of any suitable length and is relatively small in diameter as compared with the diameter of the two tanks 10 and 11. This neck leads into the bottom of the upper tank and within the upper tank there may be installed any conventional or suitable form of mist extractor. The particular form of mist extracting means that is installed in the upper tank is immaterial insofar as the present invention is concerned inasmuch as any preferred or efficient type of construction may be employed. I have illustrated, however, a catch basin 20 mounted in the bottom of the tank 11 as by braces or supports 21 and a system of staggered baffles 22 and 23 which provide a tortuous passage for the gas and contained mist. The mist which deposits on these baffles may drip therefrom onto the catch basin 20. At the top of the upper tank there is illustrated a conically shaped member 24 having inlet openings 25 adjacent its top and within this member there is a second conically shaped member 26 having a perforated bottom 27. The gas outlet from the separator is illustrated at 28. A drain tube 29 extends downwardly from the conical member 24 to adjacent the catch basin and a second drain tube 30 extends downwardly from the catch basin 20 and through the neck 19. The lower end of this drain tube telescopically extends into a drain tube section 31 that may be mounted in the lower tank and which serves to discharge the drainage from the mist extractor tank into the lower tank.

Regardless of the specific design of the mist extractor all mist extractors used on separators of this character have some tube or duct for conducting drainage down into the liquid that separates from the gas at the locality of primary separation. By having such duct or drain tube arranged to be extended downwardly through the neck and to have a telescopic connection or other connection with the drain tube section 31 it will be appreciated that the lower and upper tanks may be made up and kept in stock and at the time of installation a neck of appropriate length may be inserted between them. By merely lengthening or shortening the drain tube 30 this tube will accommodate itself to the size of neck 19 that is selected.

In some instances the neck 19 may be made relatively short but if the separator is to separate gases from liquids delivered from wells producing frothy oils or which surge violently the neck 19 may be lengthened or extended considerably so as to have the mist extracting chamber or tank adequately remote from the entrance to the separator so that it will not be affected thereby or overloaded. The neck 19 if lengthened provides a relatively long vertically extending passage through which the gas carrying the mist must pass and the time involved in this passage affords ample delay so that the mist is given an excellent opportunity to separate or drop out by gravity.

It will be appreciated that by employing spherically shaped tanks that the wall thickness of these tanks need not be excessive inasmuch as a spherically shaped tank inherently is highly efficient in retaining internal pressures.

From the above-described construction it will be appreciated that an improved separator is provided which is of relatively simple and durable construction and that it may be adjusted to meet various operating conditions. Furthermore by discharging the influent tangentially within the lower tank a greater opportunity for greater primary separation is afforded.

Various changes may be made in the details of construction without departing from the spirit and scope of the invention as defined by the appended claims.

I claim:

1. A liquid and gas separator comprising two vertically spaced spherically shaped tanks, means for introducing an influent into the lower tank adjacent its top in such a manner as to cause it to whirl and film over the interior of its walls, means for withdrawing liquid from the bottom of the lower tank, mist extracting means in the upper tank, means for withdrawing gas from the upper tank, a relatively small tubular neck materially smaller in diameter than the diameter of the tanks connecting the top of the lower tank to the bottom of the upper tank and a drain tube extending downwardly from the upper tank through said neck for returning drainage to the lower tank.

2. A liquid and gas separator comprising a means providing a lower spherically-shaped chamber, an upper spherically-shaped chamber spaced vertically thereabove, a tubular neck connecting the bottom of the upper chamber with the top of the lower chamber, said neck being materially smaller in diameter than the diameter of either chamber, means for introducing a mixture of liquid and gas to be separated into the lower of said chambers, means for withdrawing separated liquid from the lower of said chambers, a mist extractor in the upper of said chambers, and said means for withdrawing gas from the upper of said chambers after it has passed through the mist extractor therein.

3. A liquid and gas separator comprising means providing a lower spherically-shaped chamber, an upper spherically-shaped chamber spaced vertically thereabove, a tubular neck connecting the bottom of the upper chamber with the top of the lower chamber, said neck being materially smaller in diameter than the diameter of either chamber, a baffle extending horizontally across the upper portion of the lower chamber having an aperture therein in vertical registration with the neck, means for introducing a mixture of liquid and gas to be separated into the lower chamber beneath the baffle in a direction to engage the walls of the lower chamber and to whirl thereon, means for withdrawing separated liquid from the lower of said chambers, a mist extractor in the upper of said chambers, and means for withdrawing gas from the upper of said chambers after it has passed through the mist extractor.

RALPH L. FOWLER.

REFERENCES CITED

The following references are of record in the file of this patent:

UNITED STATES PATENTS

| Number | Name | Date |
|---|---|---|
| 1,661,685 | Walker | Mar. 6, 1928 |
| 1,775,362 | Demarcus | Sept. 9, 1930 |
| 1,970,783 | Walker | Aug. 21, 1934 |